(12) United States Patent
Horne

(10) Patent No.: US 6,580,030 B1
(45) Date of Patent: Jun. 17, 2003

(54) PANEL FOR ELECTRICAL CABINET

(75) Inventor: David Horne, South Wonston (GB)

(73) Assignee: APW Electronics Limited, Hampshire (GB)

( * ) Notice: Subject to any disclaimer, the term of this patent is extended or adjusted under 35 U.S.C. 154(b) by 0 days.

(21) Appl. No.: 09/889,684

(22) PCT Filed: Jan. 14, 2000

(86) PCT No.: PCT/GB00/00098

§ 371 (c)(1),
(2), (4) Date: Mar. 22, 2002

(87) PCT Pub. No.: WO00/44075

PCT Pub. Date: Jul. 27, 2000

(30) Foreign Application Priority Data

Jan. 19, 1999 (GB) ................................................ 9901142

(51) Int. Cl.$^7$ ................................................ H02G 3/08
(52) U.S. Cl. ...................... 174/50; 174/58; 220/4.02; 312/265.1; 248/906; 439/535
(58) Field of Search ............................. 174/58, 50, 66, 174/67, 63; 220/3.2, 241, 242, 4.02, 3.8, 657; 439/535; 248/906; 312/265.1–265.6; 361/601, 602

(56) References Cited

U.S. PATENT DOCUMENTS 4,899,900 A * 2/1990 Debus et al. ............... 220/4.02
6,392,141 B1 * 5/2002 Smith et al. .................... 174/50
6,437,238 B1 * 8/2002 Annerino et al. .............. 174/50
6,443,322 B1 * 9/2002 Braun et al. ................ 220/4.02

FOREIGN PATENT DOCUMENTS

DE    88 13 028       12/1988
EP    0 684 672 A     11/1995

* cited by examiner

Primary Examiner—Dean A. Reichard
Assistant Examiner—Dhiru R Patel
(74) Attorney, Agent, or Firm—Renner, Otto, Boisselle & Sklar, LLP

(57) ABSTRACT

A panel includes a sheet of metal folded to define an elongate main panel portion (100, 200) along the edges of which are a first longitudinal side flange (101, 201) and a first transverse end flange (103, 203). The first longitudinal side flange is along at least part of its length folded back towards the main panel portion (100, 200) and secured thereto to provide a tubular edge reinforcement of the panel. The first longitudinal side flange (101, 201) has a first longitudinal end which is secured to the first transverse end flange (103, 203). A portion (107) of the first longitudinal side flange (101) generally parallel to the main panel portion (100) has a longitudinal extension (115) which is folded towards the main panel portion (100) and is secured to a portion of the first transverse end flange (103) extending away from the main panel portion (100).

21 Claims, 7 Drawing Sheets

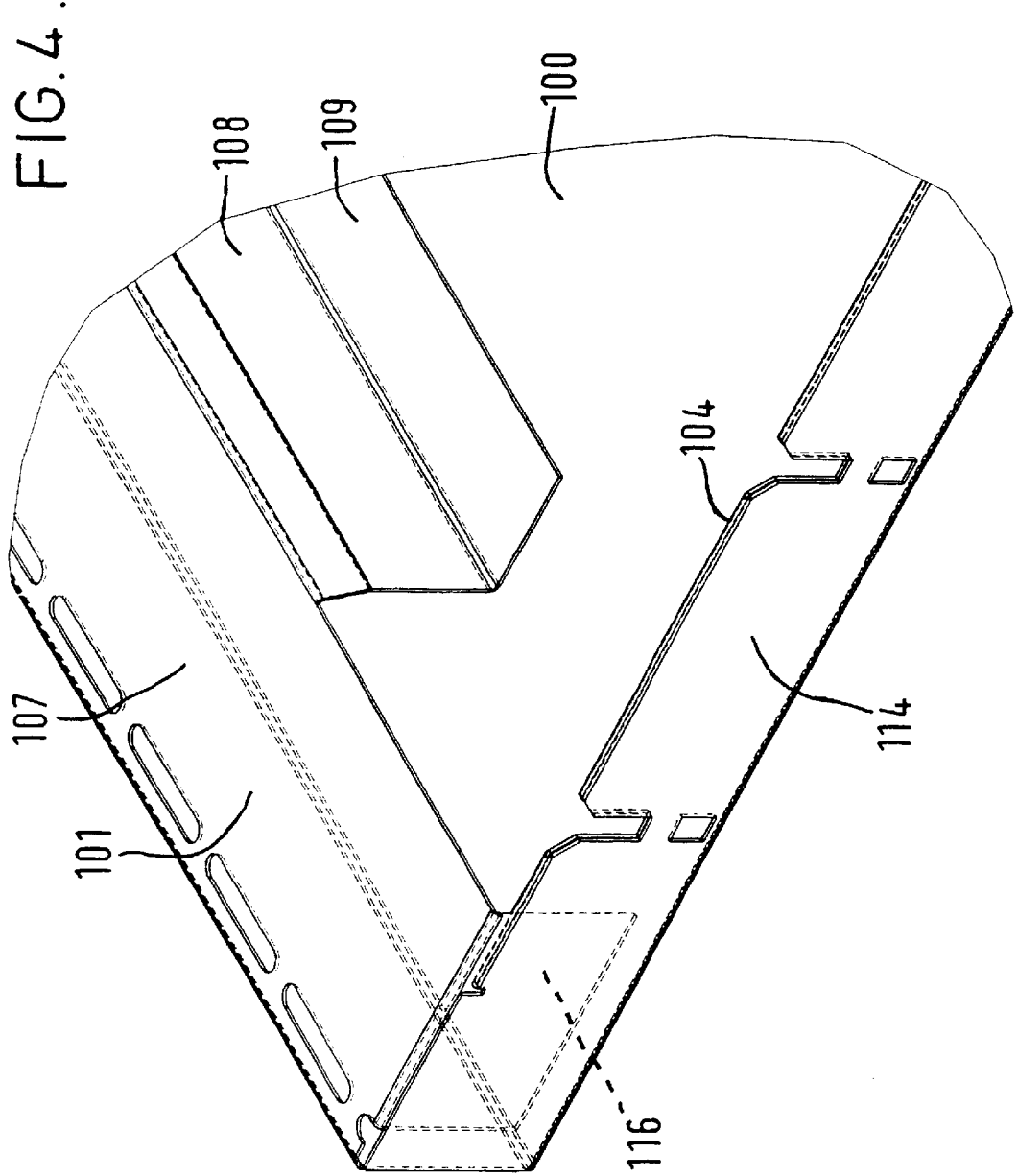

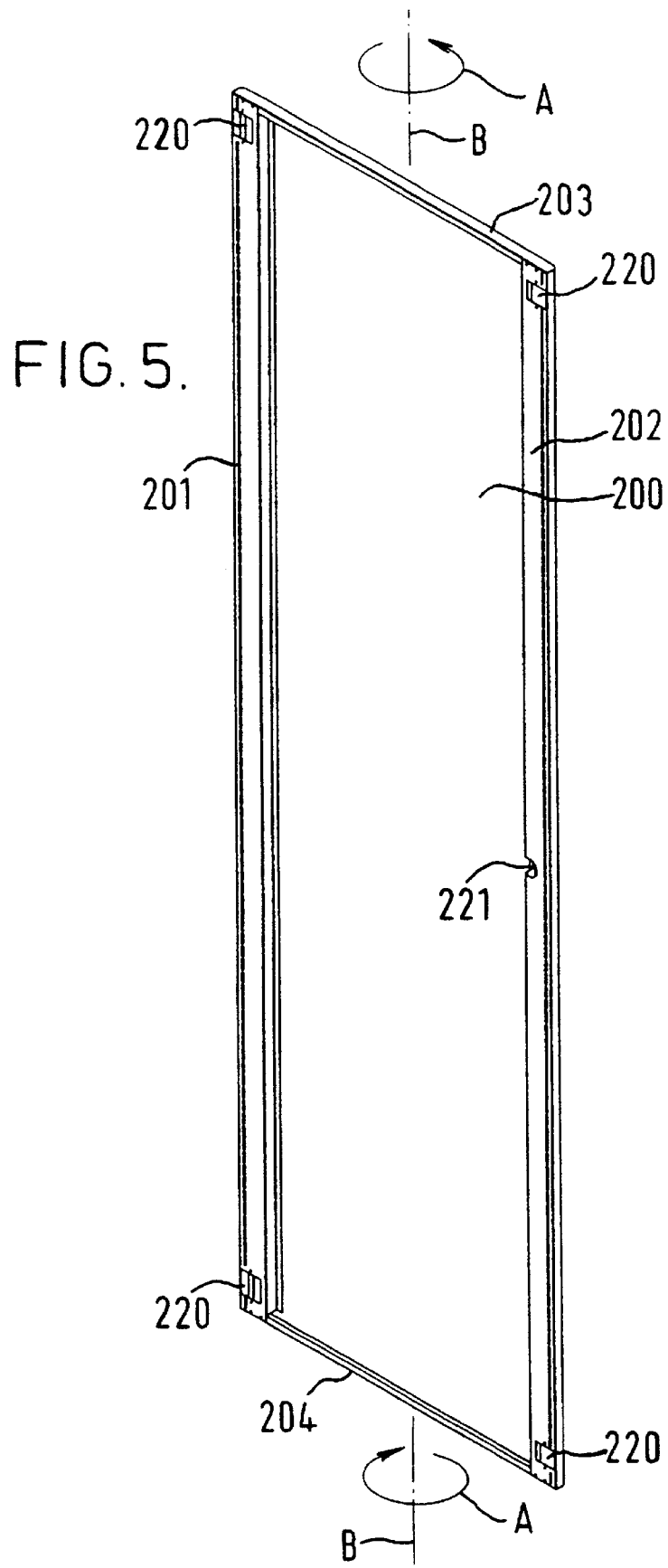

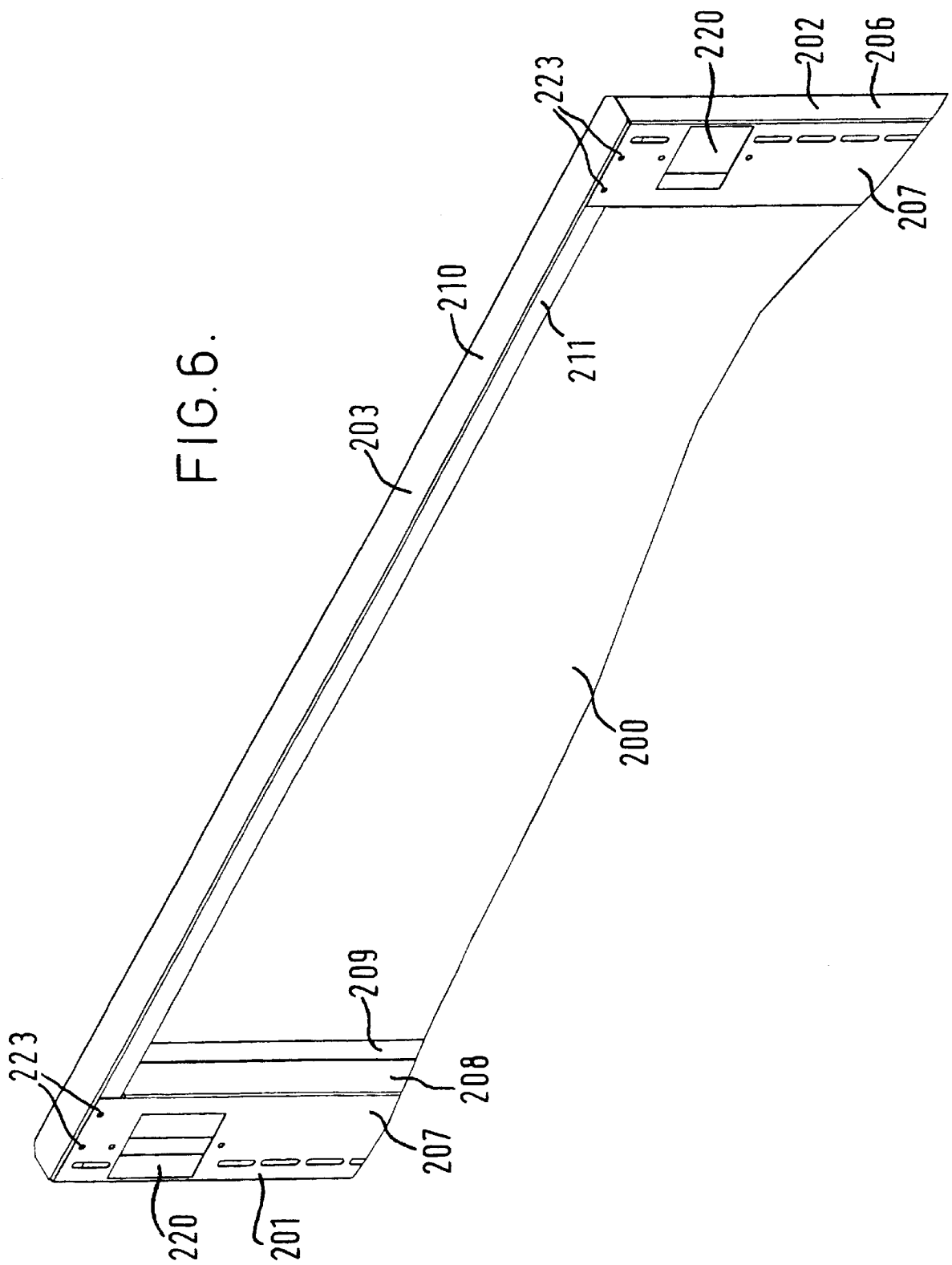

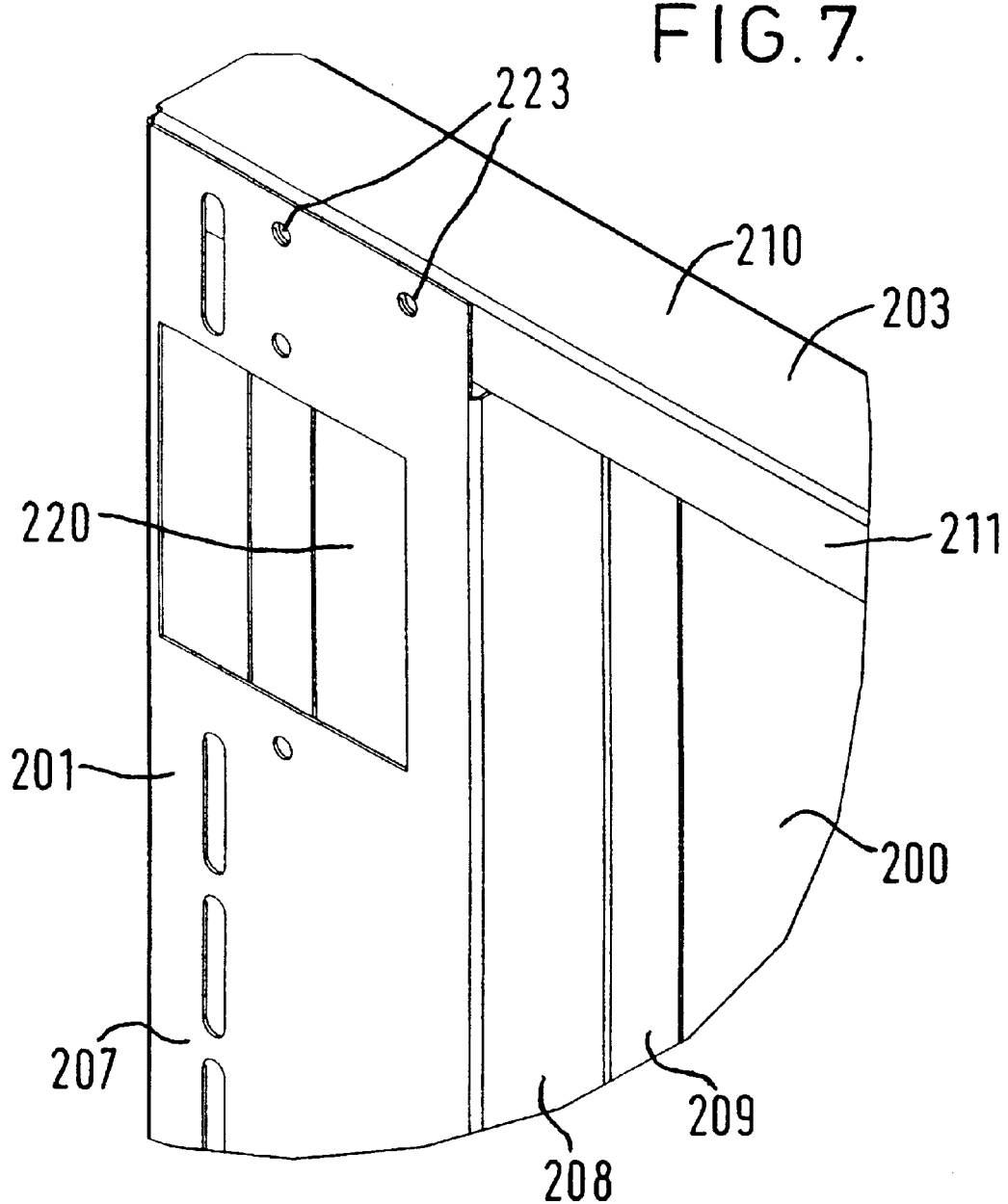

PANEL FOR ELECTRICAL CABINET

CROSS-REFERENCE TO RELATED APPLICATIONS

This application is a 35 USC 371 application of PCT/GB00/00098 filed on Jan. 14, 2000.

FIELD OF THE INVENTION

The invention relates to a panel particularly but not exclusively a removable side or door panel for mounting on a frame of an electrical cabinet of the type used to receive electronic and/or electrical components.

BACKGROUND OF THE INVENTION

Electrical cabinets are commonly used in the operation of local data networks. Components such as subracks carrying electronic and electrical circuitry, fans and other accessories are mounted within the cabinet on the internal frame. The frame is then clad with side panels and an openable door panel. These side panels and the door panel need to be easily fittable to the frame and detachable therefrom, to facilitate the initial mounting of components on the frame and their subsequent in-use servicing.

Current electrical cabinets have removable side and door panels which are quite heavy for a person to lift on and off the frame, in view of the large area of the sheet metal used to form the panel (a typical panel can be 2 meters tall and up to 1 meter wide) and the thickness or gauge of the sheet metal (typically 1.5 mm, but always in excess of 1 mm).

A known removable door panel produced by Vero Electronics Limited comprises a sheet of metal of 1.5 mm thickness folded to define an elongate main panel section along the vertical edges of which are longitudinal side flanges and along the horizontal top and bottom edges of which are transverse end flanges. The longitudinal side flange at the hinge side of the panel is along its full length folded back towards the main panel portion and has a foot which is secured to the main panel portion to define a closed rectangular box section which acts as an edge reinforcement up along the hinge side of the door panel. The top and bottom ends of this closed box section are not attached to the top and bottom horizontal end flanges of the panel. Consequently, the door panel is poor at resisting torsion about the longitudinal axis of the panel. The primary purpose of the closed-box section is to provide longitudinal bending rigidity.

As an alternative constructional technique used in known door and side panels, it is possible to add separate stiffeners which provide the desired torsional and longitudinal bending rigidity, but the use of such extra components increases the manufacturing cost and complexity.

SUMMARY OF THE INVENTION

According to one aspect of the present invention there is provided a panel comprising a sheet of metal folded to define an elongate main panel portion along the edges of which are a first longitudinal side flange and a first transverse end flange, wherein:

the first longitudinal side flange is along at least part of its length folded back towards the main panel portion and secured thereto to provide a tubular edge reinforcement of the panel: and the first longitudinal side flange has a first longitudinal end which is secured to the first transverse end flange.

The securing of the first longitudinal side flange to the first transverse end flange provides improved torsional rigidity about the longitudinal axis of the panel. This removes the need to use separate components, such as stiffeners, to provide the rigidity. Thus, the manufacturing process is reduced in cost and simplified.

Also, it becomes possible to use metal sheet which is thinner than previously used. For example, the thickness of the sheet of metal may be 0.9 mm or less, more preferably 0.8 mm or less, more preferably 0.7 mm or less, more preferably 0.6 mm or less, or even more preferably 0.5 mm or less.

Preferably, the first longitudinal end of the first longitudinal side flange is secured to the first transverse end flange at a plurality of locations along the first transverse end flange. The increased number of rigid connections between the two flanges provides increased torsional rigidity. This is particularly true if the connection locations are widely spread, apart along the first transverse end flange.

Conveniently, the flanges are rigidly connected together by spot welding. Alternatively, seam welding could be used. In some embodiments, it is even possible that gluing using structural adhesives might be acceptable.

Preferably, the first transverse end flange is along at least part of its length folded back towards the main panel portion and secured thereto to provide a tubular edge reinforcement of the panel. This assists the panel in resisting transverse bending.

Preferably, the sheet of metal is folded to define a second transverse end flange at the opposite end to the first transverse end flange, and the first longitudinal side flange has a second longitudinal end which is secured to the second transverse end flange. By having rigid connections between the first longitudinal side flange and the two transverse end flanges at both ends of the panel, the torsional rigidity is increased yet further.

Preferably, the sheet of metal is folded to define a second longitudinal side flange at the opposite side to the first longitudinal side flange; the second longitudinal side flange is along at least part of its length folded back towards the main panel portion and secured thereto to provide a tubular edge reinforcement of the panel, and the second longitudinal side flange has first and second longitudinal ends which are secured to the first and second transverse end flanges respectively. The resulting panel has very good resistance to torsional bending about the longitudinal panel axis, in view of the rigid connections at all four corners of the panel between the side and end flanges.

According to a further aspect of the present invention, there is provided an electrical cabinet comprising a frame for receiving electronic and electrical components, and one or more removable side panels as described above and/or a removable door panel as described above.

BRIEF DESCRIPTION OF THE DRAWINGS

Non-limiting embodiments of the present invention will now be described, by way of example only, with reference to the accompanying drawings, in which:

FIG. 4 is an enlarged view of the bottom left hand corner of the side panel of FIG. 1;

FIG. 5 is a perspective view of the back of a removable door panel in accordance with the present invention;

FIG. 6 is an enlarged view of the top of the door panel of FIG. 5; and

FIG. 7 is an enlarged view of the top left hand corner of the door panel of FIG. 5.

DETAILED DESCRIPTION OF THE INVENTION

Figure 1:
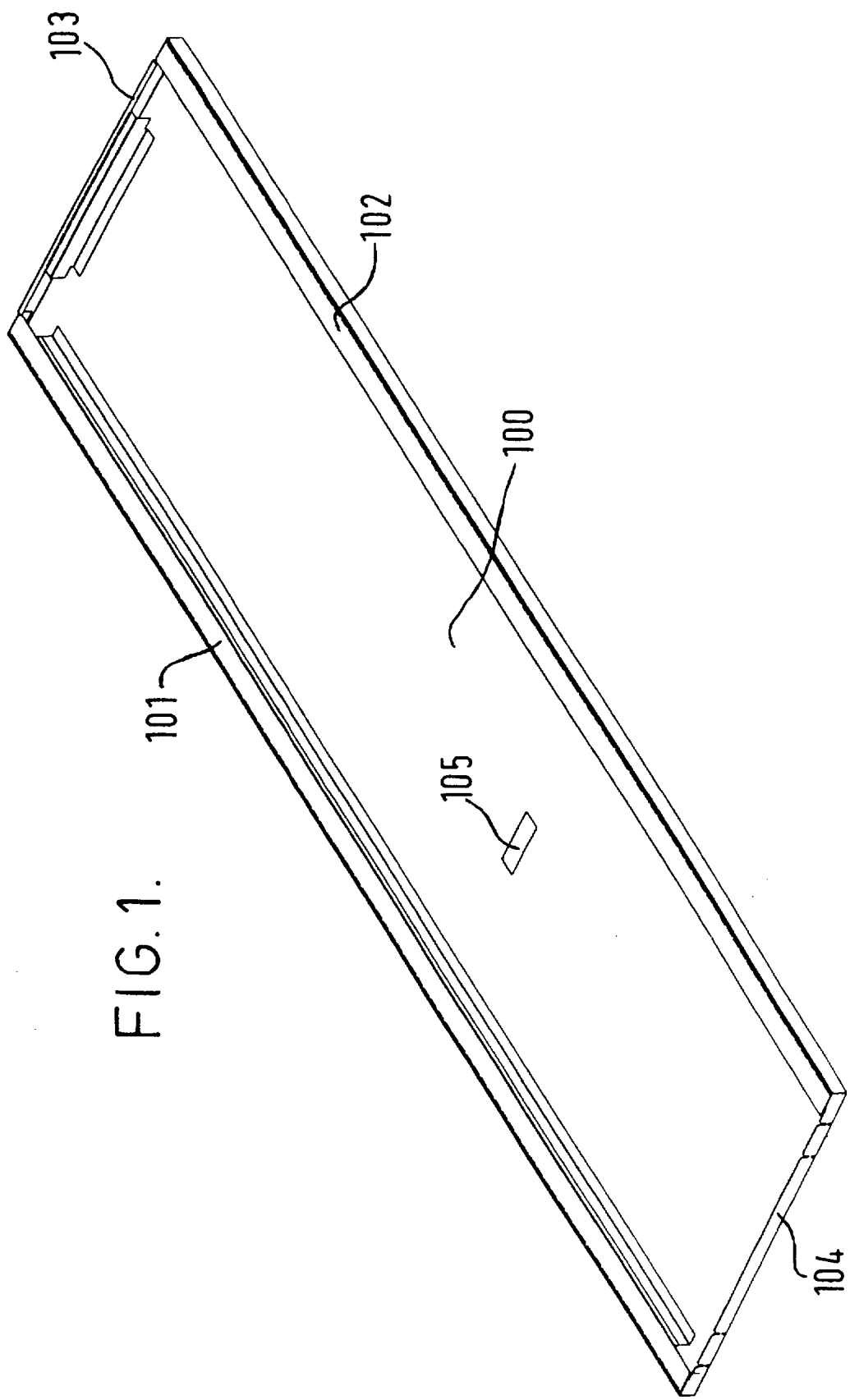
FIG. 1 is a perspective view of the back of a removable side panel in accordance with the present invention.

Referring first to the removable side panel of FIGS. 1–4, the panel is folded up from a sheet of metal of 0.5 mm thickness. The folding process results in the panel having a rectangular main panel portion 100, two longitudinal side flanges 101 102 which are mirror images of one another, an upper transverse end flange 103 and a lower transverse end flange 104.

A hand hold 105 has previously been punched out in the main panel portion 100 to assist, in use, the fitting of the panel to a cabinet frame and its removal therefrom.

Each of the longitudinal side flanges 101, 102 comprises an edge portion 106 which is the full length of the panel and extends away from the main panel portion 100. The edge portion 106 leads to an inwardly pointing portion 107 of the flange. This portion 107 is spaced apart from the main panel portion 100 and is also the full length of the panel. Each portion 107 leads to a further, return portion 108 of the flange which returns towards the main panel portion 100. The return portion 108 is shorter than the panel length and stops short of the upper and lower flanges 103, 104. Finally, the return portion 108 leads to a foot portion 109 which is the same length as the return portion 108 and abuts against the back surface of the main panel portion 100 and is spot welded thereto along its length. As an alternative to spot welding, a structural adhesive could be used.

It may be seen that each of the longitudinal side flanges 101, 102 comprising its portions 106, 107, 108 and 109 cooperates with the main panel portion 100 to form a reinforcement along a substantial, central part of the longitudinal length of the panel. The reinforcement is in the form of a generally tubular structure provided by the flange portions 106, 107, 108 and 109 and the adjacent part of the main panel portion. Specifically, a closed box section which is generally rectangular in cross-section is formed up both of the sides of the panel.

The construction of the upper transverse end flange 103 is generally similar to that of the flanges 101, 102 in that it comprises an edge portion 110 which leads to an inwardly-pointing portion 111 which in turn leads to a return portion 112 and a foot portion 113 which is spot welded along its length to the main panel portion 100.

The portions 110, 111, 112 and 113 of the upper flange 103 define with the main panel portion 100 an upper transverse edge reinforcement which assists in resisting transverse bending in a manner analogous to the way in which the edge reinforcements provided by the flanges 101, 102 resist longitudinal bending of the panel.

The lower flange 104 is a simple type of flange and merely comprises an edge portion 114.

At the top left hand corner of the rear of the panel, the portion 107 of the longitudinal side flange 101 has a longitudinal extension 115 which is folded down towards the main panel portion 100 and is spot welded at a number of locations to the left hand end of the edge portion 110 of the upper flange 103.

Figure 2:
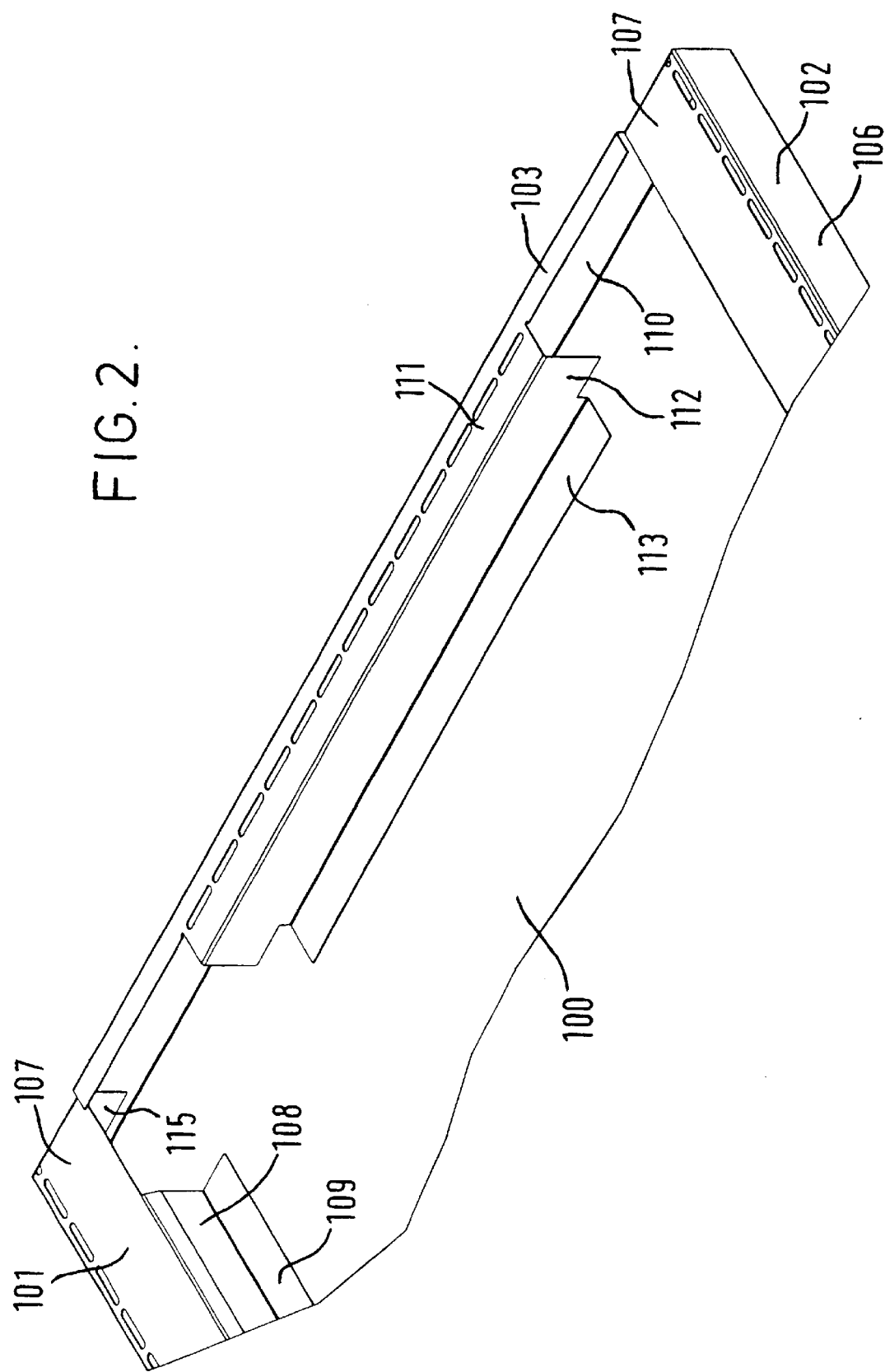
FIG. 2 is an enlarged view of the top of the side panel of FIG. 1.
Figure 3:
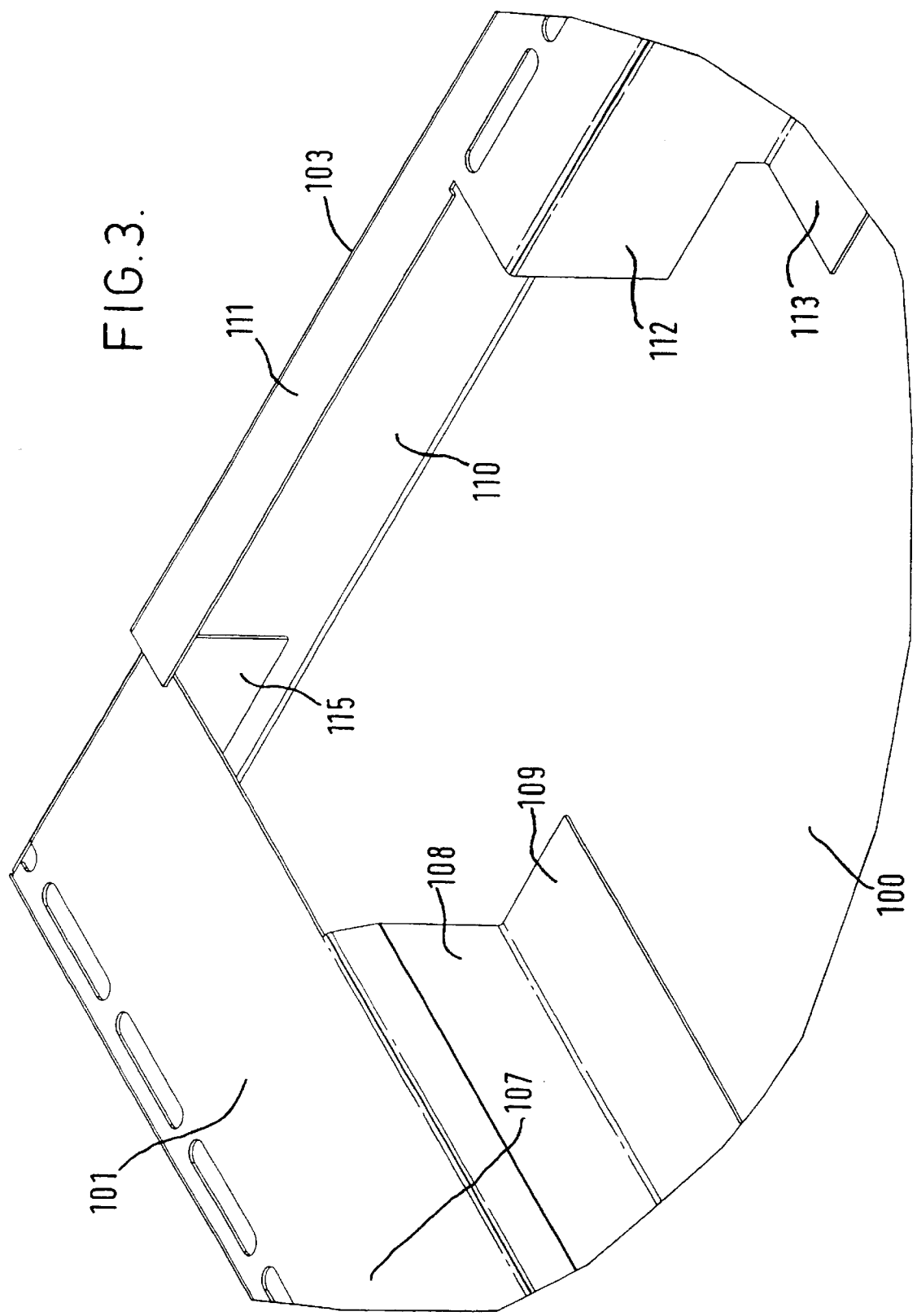
FIG. 3 is an enlarged view of the top left hand corner of the side panel of FIG. 1.

Although not visible in FIG. 2, a similar longitudinal extension is provided at the top end of the side flange 102 and is spot welded to the inner face of the right hand end of the edge portion 110 of the upper flange 103.

Thus, rigid connections are provided between the two longitudinal side flanges 101, 102 and the upper transverse end flange 103.

At the bottom of the panel, the portion 107 of each side flange 101, 102 is provided with a longitudinal extension 116 which is folded towards the main panel portion 100 and spot welded to the inner face of the respective end of the edge portion 114 of the lower flange 104.

Because the side panel has rigid connections at all four corners between the side flanges 101, 102 and the upper and lower flanges 103, 104, the panel still has good resistance to torsional bending of the panel about its longitudinal axis in spite of the fact that the sheet metal used to form the panel has a thickness of only 0.5 mm compared with the much thicker material (typically 1.5 mm) used in the prior art.

The side panel does not need to incorporate separate components, such as stiffeners, to provide the desired torsional rigidity and longitudinal and transverse bending rigidity. Thus, manufacturing costs are reduced and manufacturing is simplified.

The thinness of the sheet metal used to form the side panel gives the panel a low weight that makes it easier to be manipulated by a user when fitting the panel to and removing the panel from a frame of an electrical cabinet.

A second embodiment of the present invention as applied to a removable door panel is shown in FIGS. 5–7. Where components of the second embodiment are the same as for the first embodiment, the same reference numerals have been used except that the first of the three digits has been changed from 1 to 2.

The second embodiment differs from the first embodiment in that for the upper flange 203, the portions 211, 212, 213 are the full width of the door panel.

Also, the construction of the lower flange 204 is the mirror image of that of the upper flange 203.

Also, for the longitudinal side flanges 201, 202, the portions 208, 209 are longer at both the top and bottom of the panel. The door panel of FIGS. 5–7 does not have components analogous to the extensions 115, 116 of the first embodiment.

Instead the four flanges are rigidly connected together in the same manner at each of the four corners by having the respective end of the portion 207 of the respective side flange 201, 202 project over the adjacent end of the portion 211 of the upper flange 203 or the equivalent portion of the lower flange 204 and be riveted thereto at two locations. The rivet holes 223 at each corner are shown, but the rivets are omitted for the sake of clarity.

As already stated, the lower flange 204 is a mirror image of the upper flange 203. Consequently, in the second embodiment, the same type of rigid connection is provided at all four corners.

In both embodiments, the rigid connection (spot weld or rivet) at each corner that is spaced inwardly the greatest distance from the corner in question is the connection that is most effective in ensuring that the panel is good at resisting torsion about the longitudinal panel axis. The torsional forces are diagrammatically shown in FIG. 5, where opposite torsional forces indicated by arrows A are shown acting about the longitudinal axis B of the panel.

The door panel has four hinge recesses 220 to enable the door panel to be mounted along either side to the cabinet frame. There is also a lock recess 221 to enable a lock to be fitted to the door panel.

What is claimed is:

1. A panel comprising:

a sheet of metal folded to define an elongate main panel portion (100, 200) along the edges of which are a first longitudinal side flange (101, 201) and a first transverse end flange (103, 203), the first longitudinal side flange being along at least part of its length folded back towards the main panel portion (100, 200) and secured thereto to provide a tubular edge reinforcement of the panel, the first longitudinal side flange (101, 201) having a first longitudinal end which is secured to the first transverse end flange (103, 203);

wherein a portion (107) of the first longitudinal side flange (101) generally parallel to the main panel portion (100) has a longitudinal extension (115) which is folded towards the main panel portion (100) and is secured to a portion of the first transverse end flange (103) extending away from the main panel portion (100).

2. A panel according to claim 1, wherein the thickness of the sheet of metal is 0.9 mm or less.

3. A panel according to claim 1, wherein the thickness of the sheet of metal is 0.8 mm or less.

4. A panel according to claim 1, wherein the thickness of the sheet of metal is 0.7 mm or less.

5. A panel according to claim 1, wherein the thickness of the sheet of metal is 0.6 mm or less.

6. A panel according to claim 1, wherein the thickness of the sheet of metal is 0.5 mm or less.

7. A panel according to claim 1, wherein the first longitudinal end of the first longitudinal side flange (201) is secured to the first transverse end flange (203) at a plurality of locations (223) along the first transverse end flange (203).

8. A panel according to claim 1, wherein a portion (207) of the first longitudinal side flange (301) generally parallel to the main panel portion (200) is secured to a portion (211) of the first transverse end flange (203) generally parallel to the main panel portion (200).

9. A panel according to claim 1, wherein the first transverse end flange (103, 203) is along at least part of its length folded back towards the main panel portion (100, 200) and secured thereto to provide a tubular edge reinforcement of the panel.

10. A panel according to claim 1, wherein the sheet of metal is folded to define a second transverse end flange (104, 204) at the opposite end to the first transverse end flange (103, 203) and the first longitudinal side flange (101, 201) has a second longitudinal end which is secured to the second transverse end flange (104, 204).

11. A panel according to claim 10, wherein the second longitudinal end of the first longitudinal side flange (101, 201) is secured to the second transverse end flange (104, 204) at a plurality of locations along the second transverse end flange (104, 204).

12. A panel according to claim 10, wherein a portion (207) of the first longitudinal side flange (201) generally parallel to the main panel portion (200) is secured to a portion of the second transverse end flange (204) generally parallel to the main panel portion (200).

13. A panel according to claim 10, wherein a portion (107) of the first longitudinal side flange (101) generally parallel to the main panel portion (100) has a longitudinal extension (116) which is folded towards the main panel portion (100) and is secured to a portion of the second transverse end flange (104) extending away from the main panel portion (100).

14. A panel according to claim 10, wherein the second transverse end flange (204) is along at least part of its length folded back towards the main panel portion (200) and secured thereto to provide a tubular edge reinforcement of the panel.

15. A panel according to claim 10, wherein:

the sheet of metal is folded to define a second longitudinal side flange (102, 202) at the opposite side to the first longitudinal side flange (101, 201);

the second longitudinal side flange (102, 202) is along at least part of its length folded back towards the main panel portion (100, 200) and secured thereto to provide a tubular edge reinforcement of the panel; and the second longitudinal side flange (102, 202) has first and second longitudinal ends which are secured to the first and second transverse end flanges (103, 104, 203, 204) respectively.

16. A panel according to claim 15, wherein each longitudinal end of the second longitudinal side flange (102, 202) is secured to the respective transverse end flange (103, 104, 203, 204) at a plurality of locations along the respective transverse end flange.

17. A panel according to claim 15, wherein at each longitudinal end of the second longitudinal side flange (202) a portion (207) of the second longitudinal side flange (202) generally parallel to the main panel portion (200) is secured to a portion of the respective transverse end flange (203, 204) generally parallel to the main panel portion (200).

18. A panel according to claim 15, wherein at each longitudinal end of the second longitudinal side flange (102) a portion (107) of the second longitudinal side flange (102) generally parallel to the main panel portion (100) has a longitudinal extension (115, 116) which is folded towards the main panel portion (100) and is secured to a portion of the respective transverse end flange (103, 104) extending away from the main panel portion (100).

19. An electrical cabinet comprising a frame for receiving electronic and electrical components, and one or more removable side panels according to claim 1.

20. An electrical cabinet comprising a frame for receiving electronic and electrical components, and a panel according to claim 1 formed as a removable door panel.

21. An electrical cabinet comprising a frame for receiving electronic and electrical components, and removable door and side panels each according to claim 1.

* * * * *